United States Patent

Fagerdahl

[11] Patent Number: 5,943,901
[45] Date of Patent: *Aug. 31, 1999

[54] ALIGNER FOR DAMAGED VEHICLE BODYWORK AND VEHICLE CHASSIS

[75] Inventor: Sten Fagerdahl, Orebro, Sweden

[73] Assignee: Josam Lastbilteknik AB, Orebro, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/545,601
[22] PCT Filed: Apr. 28, 1994
[86] PCT No.: PCT/SE94/00385
  § 371 Date: Jan. 29, 1996
  § 102(e) Date: Jan. 29, 1996
[87] PCT Pub. No.: WO94/25193
  PCT Pub. Date: Nov. 10, 1994

[30] Foreign Application Priority Data

Apr. 30, 1993 [SE] Sweden ................... 9301485

[51] Int. Cl.⁶ ........................................ B21D 1/12
[52] U.S. Cl. ................ 72/446; 72/705; 254/2 B
[58] Field of Search ........................... 16/32, 34; 72/705, 72/446; 254/2 B; 280/43.14, 46

[56] References Cited

U.S. PATENT DOCUMENTS 3,122,194  2/1964  Bronson et al. ................... 153/32
3,698,230  10/1972  Buske ................................ 72/705
4,281,532  8/1981  Covington ......................... 72/457
4,309,895  1/1982  Samuelsson ...................... 72/457
5,101,654  4/1992  Stevens ............................. 72/705

FOREIGN PATENT DOCUMENTS 1379076  1/1975  United Kingdom .
2026070  1/1980  United Kingdom ................ 16/34

*Primary Examiner*—Lowell A. Larson
*Attorney, Agent, or Firm*—Hayes, Soloway, Hennessey, Grossman & Hage P.C.

[57] ABSTRACT

The present invention relates to a longitudinal portable aligner for damaged vehicle bodywork and vehicle chassis, in conjunction with which the aligner consists of a lower part (1) executed as a frame and an upper part (2), a so-called slide, mounted in it in such a way as to be capable of displacement. The aligner is equipped with folding wheels 919) capable of adjustment between a working position, in which the frame of the aligner is in contact with the floor, and a transport position, in which the frame of the aligner adopts a free position relative to the floor. The invention is characterized in that the wheels (19) are rotatably arranged on a wheel carrier (17) which is arranged as to engage around the lower part (1) and be pivotally mounted on the outsides of the lower part, so that the wheels (19) can be caused to oscillate about the fulcra of the wheel carrier (17) via the force exerted on the web of the wheel carrier. The wheel carrier (17) consists essentially of two two-armed lever arms (18), which are connected to one another via a transverse bridge (20), which then interacts with a locking mechanism (21) for the wheel carrier (17).

7 Claims, 4 Drawing Sheets

ALIGNER FOR DAMAGED VEHICLE BODYWORK AND VEHICLE CHASSIS

The present invention relates to an arrangement for an aligner for damaged vehicle bodywork and vehicle chassis and represents a further development of the aligner arrangement in accordance with Swedish Patent No. 7712423.

The aforementioned previously disclosed aligner arrangement has proved to be appropriate for the repair and alignment of damaged vehicles, most of all in conjunction with the alignment of damaged vehicle cabs and car bodywork. The advantages are largely attributable to the adaptability of the aligner arrangement to all forms of damage to a vehicle unit, as well as to the premises concerned. This was made possible by the fact that the aligner arrangement in question is a portable aligner equipped with folding wheels, which permit alternative positioning of the aligner unit in relation to the damaged vehicle and also permit the frame of the aligner to be lowered into contact with a workshop floor and secured to it by means of bolted connections or similar clamping devices. In the aforementioned previously disclosed embodiment, the aligner comprises a longitudinal alignment bar executed with a longitudinal guide for a carriage supported in such a way as to be capable of displacement. This is supported in roller bearings in the aligner and is equipped with alignment devices for exerting a pulling or pushing effect on the damaged vehicle unit. The force required for performing such operations is provided via controlled displacement movements of the carriage relative to the alignment bar, which movements are counterbalanced by servo-controlled actuating devices, for example hydraulic devices, anchored to the alignment bar. Forces acting obliquely in relation to the longitudinal extent of the alignment bar often make their effect felt during such operations. This imposes considerable stresses on the roller bearings and gives rise to high surface pressures in the bearing channels of the alignment bar, which stresses cause wear to take place which reduces the service life of said units.

The object of the present invention is to eliminate the aforementioned disadvantages and to increase the effective power range of such aligners, and also to facilitate the manageability of such aligners through a reduction in weight and a simplified wheel positioning mechanism. Like the previously disclosed aligner the present invention relates to a portable longitudinal aligner consisting of a lower part executed as a frame and an upper part, a so-called slide, mounted in it in such a way as to be capable of displacement, in conjunction with which the aligner is equipped with folding wheels capable of adjustment between a working position, in which the frame of the aligner is in contact with a floor or the like, and a transport position, in which the frame of the aligner adopts a free position relative to the floor. The invention is thus characterized essentially in that each of the wheels is mounted in such a way as to be capable of rotating at its free end on a wheel carrier which engages around the lower part and is pivotally mounted on the outsides of the lower part, and in that the wheels can be caused to oscillate about the fulcra of the wheel carrier via the force exerted on the web of the wheel carrier.

The arrangement in accordance with the invention is also characterized in that the wheel carrier consists of two two-armed lever arms, which at one end support the wheels and at the other end are capable of being assembled in such a way that they are rigidly connected to one another via a transverse bridge. The latter is preferably executed with a recess or the like intended to interact with a locking mechanism for the wheel carrier, which locking mechanism is pivotally mounted on the inside of the wheel carrier. When the bridge and the wheel carrier are adjusted to the transport position for the aligner, the locking mechanism automatically adopts a looking position against the lower part and locks the wheel carrier in the transport position. The locking mechanism can be disengaged from its locking function against the lower part by manual actuation. A limited pivoting movement from its working position can also be imparted to the wheel carrier by rotating the locking mechanism in a direction acting against its own weight.

Other characteristic features of the invention can be appreciated from the following description and Patent Claims. The description of an embodiment exemplifying the invention is given with reference to the accompanying drawings, in which FIG. 1 shows a longitudinal section through the aligner in accordance with the invention without alignment devices;

Figure 6A:
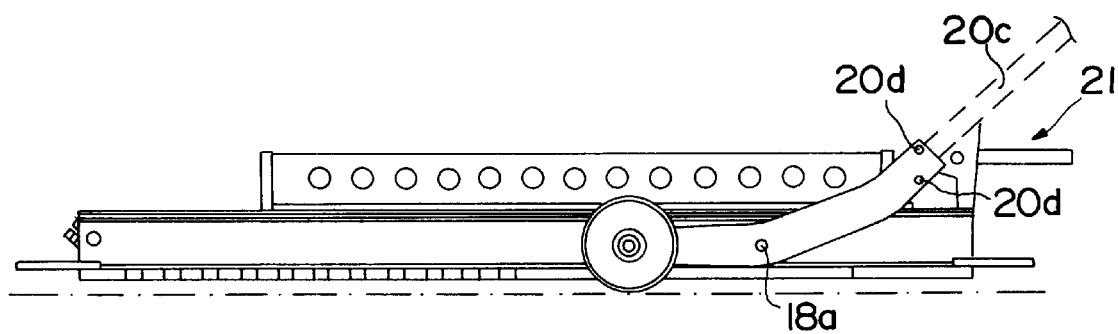
Figure 6B:
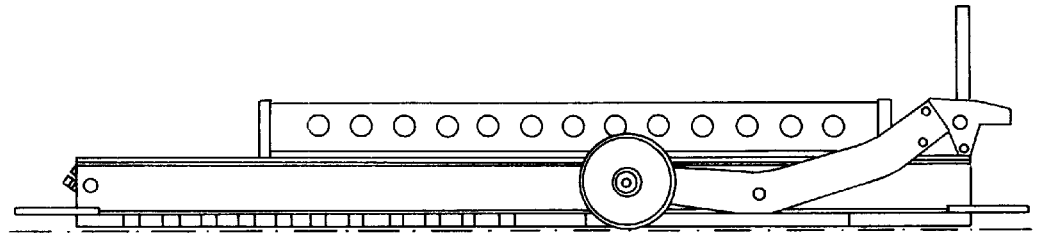
Figure 6C:
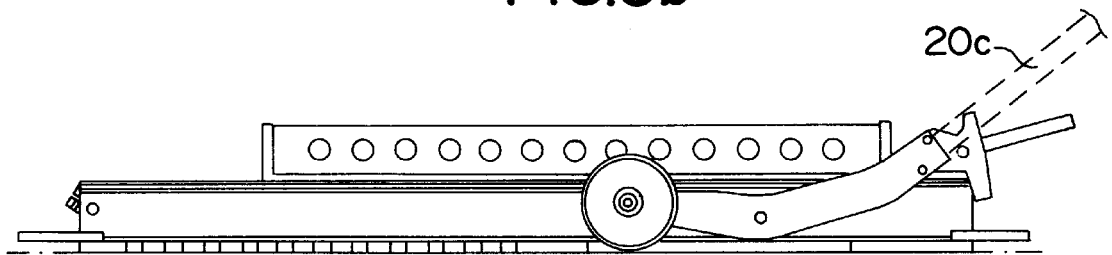

FIGS. 6A–C illustrates three different positions for the aligner in relation to the floor.

Figure 3:
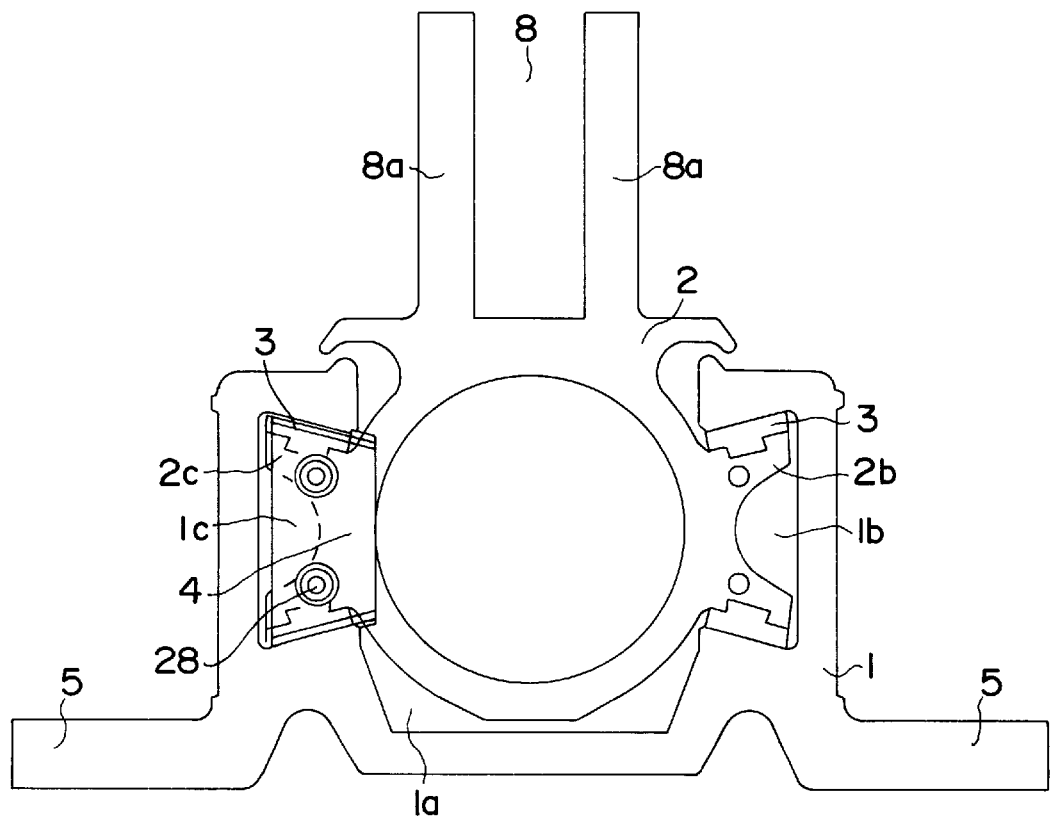
FIG. 3 shows a cross-section through the supporting profiles of the aligner in interaction with one another.
Figure 4:
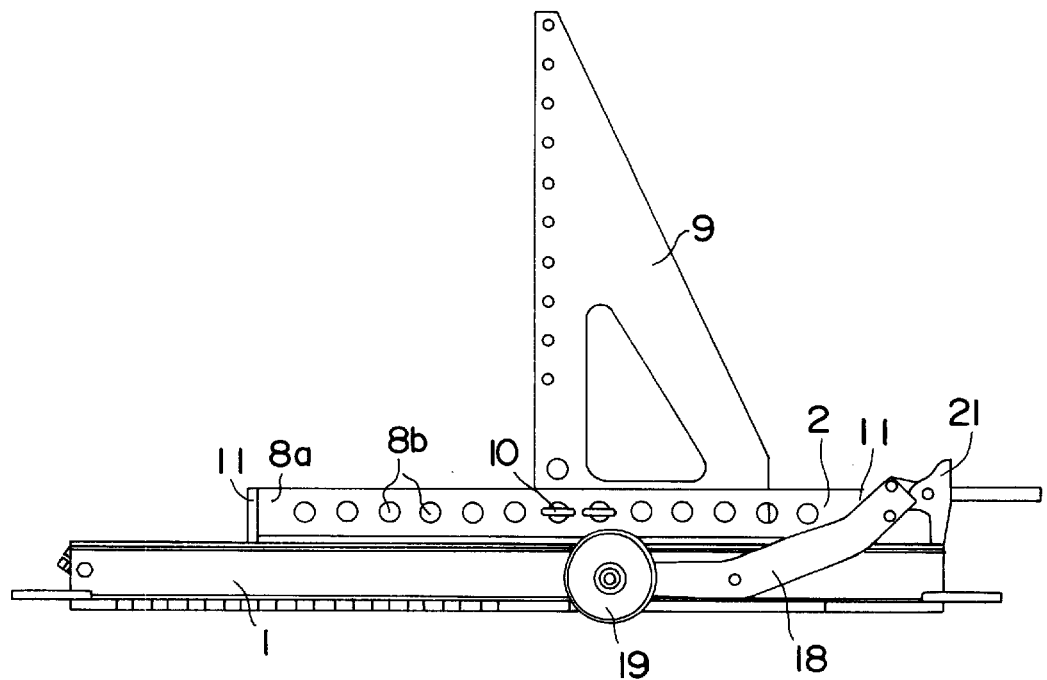
FIG. 4 shows a side view of a part of the aligner equipped with a wheel carrier and an alignment device.
Figure 5:
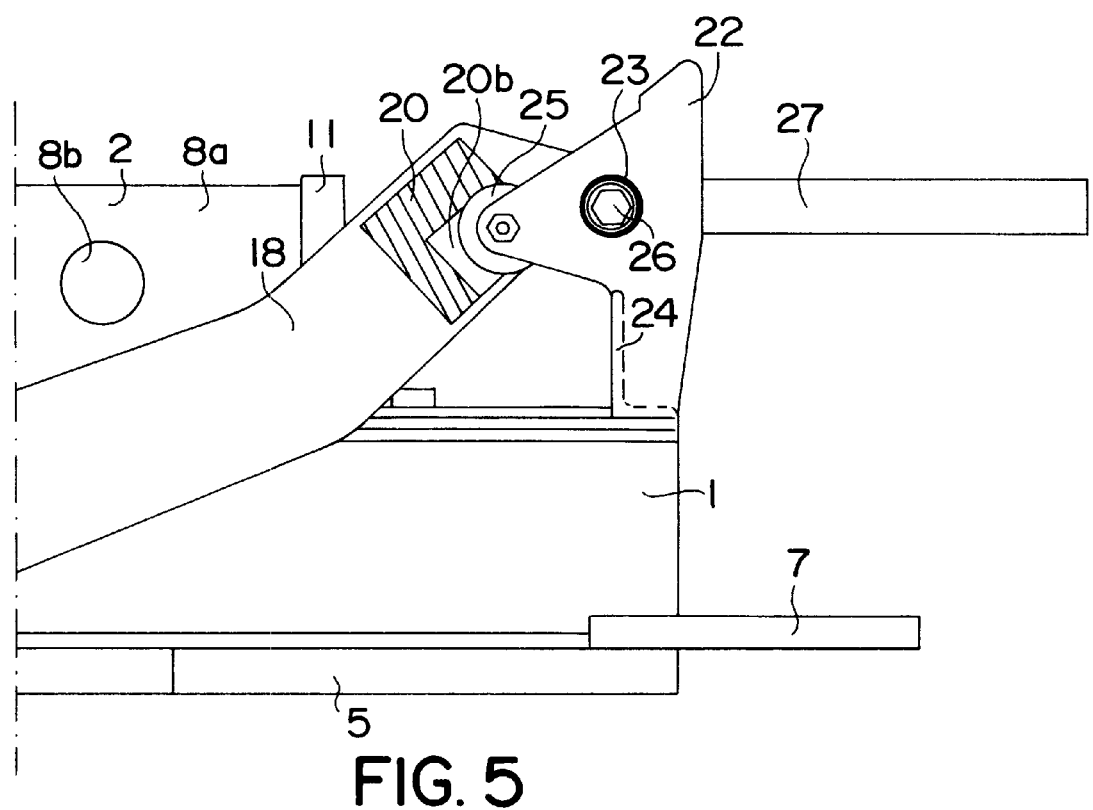
FIG. 5 illustrates the interaction of the wheel carrier with a locking mechanism as a partially cut-away cross-sectional view.

In accordance with FIG. 3, the aligner in accordance with the invention consists essentially of a lower part 1 and an upper part 2, the cross-sectional profiles of which are designed for interaction with one another in that the upper part 2 is executed on its sides with dovetail-shaped heels 2b,2c, so-called male heels, which engage in corresponding dovetail-shaped recesses 1b,1c, so-called female channels, on the insides of a U-shaped groove 1a in the lower part 1. The upper part 2, like the lower part 1, extends in a longitudinal sense, and the longitudinal extent of the upper part is approximately two thirds of the longitudinal extent of the lower part. The upper part 2 is supported on the lower part 1 in such a way as to be capable of displacement. With regard to this, the dovetail-shaped heels 2b,2c of the upper part 2 are executed on their inclined sides with dovetail-shaped recesses for sliding strips 3, which are fixed in position on the heels 2b,2c with a looking plate 4 and a couple of screws 28 at either end of the two dovetail-shaped heels 2b,2c on the upper part 2. The locking plates 4 thus act as scrapers to keep the sliding surfaces free from dirt. FIG. 3 shows only a single heel 2c fitted with a sliding strip 3, however.

Figure 1:
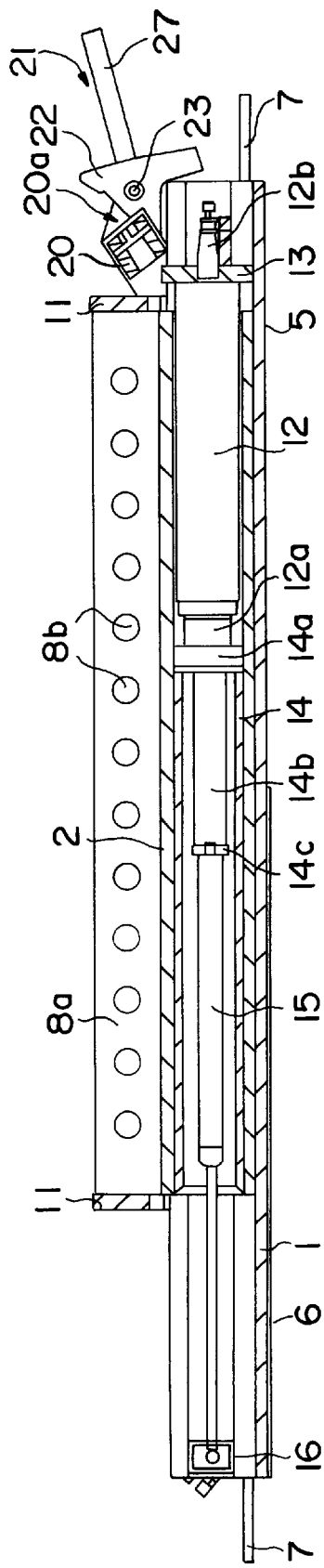
Figure 2:
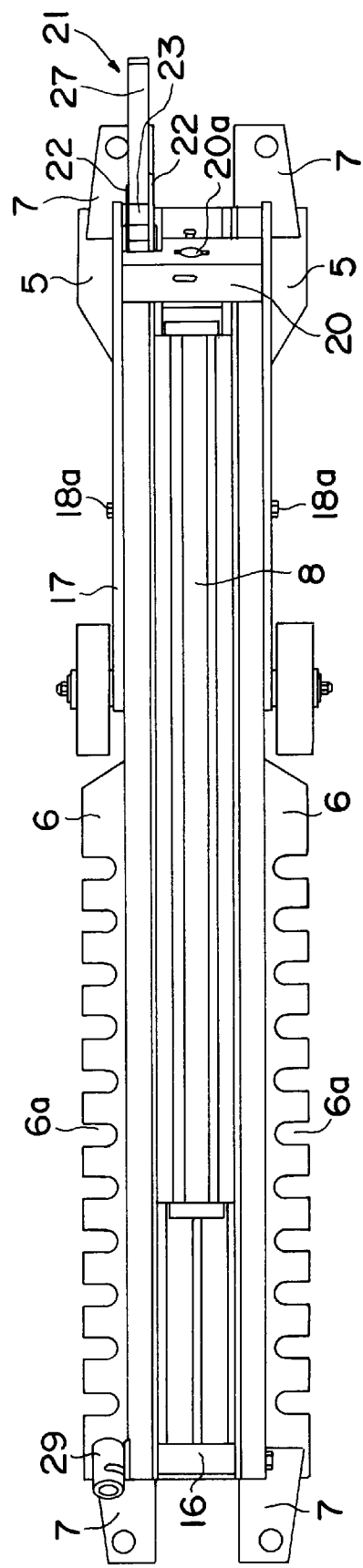
FIG. 2 Shows a plan view of the aligner without alignment devices.

The lower part 1 is executed, as previously mentioned, with a longitudinal U-shaped groove 1a, in which the upper part 2 is supported in such a way that it is capable of displacement. The lower part 1 is executed with support plates 5,6 on the sides of the aforementioned groove 1a, so as to permit contact with a floor with a width greater than the groove 1a. As can be appreciated from FIG. 2, the two support plates 5 at one end of the lower part 1 exhibit a comparatively small extent in the longitudinal sense of the lower part 1. Attached to the aforementioned support plates 5 are two perforated attachment plates 7, so-called ears.

The other end of the lower part 1 is executed for more than half of its longitudinal extent with two longitudinal support plates 6, and two perforated attachment plates 7, so-called ears, are attached to the outer end of said support plates. All these perforated attachment plates 7 extend in a longitudinal sense outside the profiled form of the lower part 1, so as to permit contact between the aligner and a cab bench or similar arrangement.

The support plates 6 are provided on their two longitudinal sides with a row of open slots 6a spaced at regular intervals, so as to permit alternative attachment of the lower part 1 and the aligner to the floor, for example a workshop floor or similar base.

The top of the upper part 2 is executed with two longitudinal parallel walls 8a, which together form a channel 8 of U-shaped cross-section. The aforementioned channel 8 provides a guide for an alignment device applied between the walls 8a, for example a bracket 9. To permit the attachment of the alignment device 9 in alternative positions, the walls forming the channel 8 are provided with a number of transverse holes 8b in a row. Inserted in the aforementioned holes are transverse bolts or pins 10, which pass through the alignment device 9 and lock it in position relative to the upper part 2. Each of the ends of the channel 8 in the upper part 2 is closed with its own blanking plate 11.

The upper part 2 and any alignment device 9 attached to it are intended to be caused to be displaced during a work operation. Such displacement movements are counterbalanced by the effect of servo-controlled actuating devices anchored to the lower part 1. These consist of an hydraulic unit comprising a piston-cylinder unit 12, which is attached in a longitudinal sense inside the lower part 1 and in contact with a transverse brace 13 at one end of the lower part 1, in conjunction with which a central nipple 12b in the end of the cylinder passes through a clearance hole in the brace 13 for attachment to a pressure source.

At the other end, the piston 12a is in contact with an end plug 14a on a longitudinal tube 14, which is rigidly attached to the upper part 2. The end plug 14a is an integral part of an inner tube 14b, which engages with the longitudinal tube 14, and the inner end of the inner tube is executed with a washer-shaped bearing 14c for a gas spring 15. The gas spring 15 is articulately mounted at its other end in a bearing attachment 16 attached in a transverse sense in the lower part 1.

The illustrative embodiment relates to an aligner executed as a press bridge, in conjunction with which the purpose of the gas spring 15 is to return the piston 12a to its initial position whenever the working pressure inside the cylinder 12 permits it.

Once a work operation is complete, it may be desirable to move the aligner to another working position or to a storage place, In order to do this, it will be necessary to release any attachment bolts for the aligner and to move the aligner with the help of a wheel carrier 17 integrated in it.

The wheel carrier 17 is executed as a U-shaped balance arm and consists of two two-armed lever arms 18, the upper ends of which are rigidly attached to one another via a handle bracket 20 capable of being assembled with screws 20d. The wheel carrier 17 is articulately mounted on the lower part 1, the so-called frame, in that each of the lever arms 18 is pivotally mounted via a screwed connection 18a to its own outside of the lower part 1. Rotatably mounted on the outside of each lever arm 18 at its lower end is a wheel 19.

Executed at the centre of the handle bracket 20 is a guide hole 20a for an actuating lever (shown in dotted lines 20c), which is designed to be inserted in the guide hole 20a . By the application of force to the actuating lever, the wheel carrier 17 can be caused to pivot about its bearing centres so that the wheels 19 are pivoted upwards from the floor. The parallelism formed between the bearing centres of the lever arms and the handle bracket 20 causes simultaneous pivoting movements of the wheel carrier for both wheels 19.

In order to secure the wheels 19 in certain predetermined positions, the wheel carrier 17 is so arranged as to interact with a locking mechanism 21. This consists of two parallel plates 22, which are rigidly connected to one another via a common hub 23 by means of screws 20d and a laterally arranged angle iron 24. A roller 25 is also pivotally mounted between the aforementioned plates 22. The locking mechanism 21. is pivotally mounted through the hub 23 on a pivot pin 26, which is attached to the inside of the upper part of one or the lever arms 18. Attached between the plates 22 and in contact with the hub 23 is a handle 27, by means of which the locking mechanism can be actuated to various positions.

When the aligner arrangement adopts its working position (FIG. 6c), the looking mechanism 21 is disconnected and the wheel carrier 17 then adopts a position with the wheels 19 raised or disengaged from the floor.

When the aligner is to be moved, the actuating lever 20c is raised, in conjunction with which the wheel carrier 17 is caused to rotate about its bearings 18a in such a way that the wheels 19 are brought into contact with the floor. For a given angle of rotation of the wheel carrier 17, the locking mechanism 21, 22 is rotated by its own weight so that the angle iron 24 will come to rest edgeways against the top side of the lower part 1 and the roller 25 is forced into contact with a wall of recess 20b in the bracket 20. The aforementioned position is the so-called transport position (FIG. 6a) of the aligner, and in the same position the lower part 1 is free relative to the floor.

When the frame of the aligner is to be lowered into contact with the floor, the operating lever 20c must first be raised, whereupon the locking mechanism 21–22 is manually actuated to provide disengagement, for example with the foot, so that the wheel carrier 17 can be rotated into the working position.

By manual actuation of the handle 27 on the locking mechanism 21 in the opposite direction of rotation to that described previously, a small amount of rotation can be imparted to the wheel carrier 17, providing limited raising of the frame of the aligner from the floor, thereby permitting fine adjustment of the working position of the aligner relative to the damaged vehicle; see FIG. 6b. The aforementioned rotational movement is limited so that the roller 25 on the locking mechanism 21 is forced into contact with the top of the lower part 1.

A handle attachment 29 is rigidly connected to the lower part 1 and the bearing attachment 16 at the other end of the aligner. This is executed with guide holes for alternative mounting of the previously mentioned operating lever when the aligner is to be moved.

The invention is not limited to the embodiment described here, but may be modified within the context of the following Patent Claims to provide alternative embodiments. It has been possible until now to design the hydraulic unit of the aligner with a double-acting piston-cylinder or with a single-acting piston-cylinder arranged to either side of the lower part of the slide in the frame.

What is claimed is:

1. A portable aligner for damaged vehicle bodywork and vehicle chassis, which aligner comprises a lower part having a frame and an upper part, a slide, slidably mounted, for displacement, on the frame of the aligner, the aligner being equipped with a single pair of retractable wheels capable of fixed vertical adjustment between a working position in which the frame of the aligner is in contact with a floor, a transport position in which the frame of the aligner is lifted above the floor, and an adjustment position in which the frame of the aligner is lifted slightly above the floor between the transport position and the working position, wherein each of the wheels is mounted, respectively, on one end of a wheel carrier arm with the other ends of said arms being rigidly connected together by a transverse bridge to form a unitary structure, said unitary structure engaging around the lower part and being pivotally mounted thereto, between the ends of said arms, at a fulcrum on the lower part, means associated with the transverse bridge to permit pivotal rotation of the two wheel carrier arms around the fulcrum to engage the floor and lift the aligner free of the floor via a force exerted on the transverse bridge, a locking mechanism pivotally associated with one of said arms adjacent the transverse bridge and movable with the transverse bridge to engage said lower part to hold said wheel carrier arms in their pivoted position in which the wheels engage the floor and, an elongate handle extending from and associated with the locking mechanism for engaging and disengaging the locking mechanism, said elongate handle also serving to assist in the positioning of said aligner when the wheels are in a transport position and the adjustment position.

2. Aligner in accordance with claim 1, wherein said transverse bridge includes a transverse guide hole for the attachment of an actuating lever.

3. Aligner in accordance with claim 2, wherein said transverse bridge includes a recess for interaction with a locking mechanism, which is pivotally mounted on the inside of one of the lever arms.

4. Aligner in accordance with claim 3, wherein when said transverse bridge and the wheel carrier are adjusted to the transport position for the aligner, the locking mechanism automatically adopts a locking position against the lower part and locks the wheel carrier in the transport position.

5. Aligner in accordance with claim 4, wherein the locking mechanism can be disengaged by manual actuation of said handle on the locking mechanism.

6. Aligner in accordance with claim 5, wherein a limited pivoting movement from its working position can also be imparted to the wheel carrier by rotating the said handle in a direction acting against its own weight.

7. Aligner according to claim 1, and further comprising a transport handle removably attached to one of said arms for assisting in positioning of said aligner when said wheels are in a transport position.

* * * * *